INVENTORS:
HIGEL S.D. ALLEN
RONALD G. HENOCQ

INVENTORS:
HIGEL S.D. ALLEN
RONALD G. HENOCQ

United States Patent Office 3,268,205
Patented August 23, 1966

3,268,205
HIGH SPEED DENTAL TURBINES
Higel Stafford David Allen, Poole, Dorset, and Ronald George Henocq, Lytchett Matravers, Dorset, England, assignors to Micro Turbines Limited, Dorset, England, a body corporate of Great Britain
Filed Mar. 9, 1964, Ser. No. 350,411
Claims priority, application Great Britain, Mar. 12, 1963, 9,731/63
4 Claims. (Cl. 253—2)

This invention relates to small high speed air-driven turbines, as used for example in dentistry for driving the conventional dental burrs.

Two advantages of such turbines are the very high speeds and the relatively high driving forces which are obtainable, permitting the drilling and other operations to be carried out very much more rapidly, and with very much less vibration, than with the belt driven drills which have been commonplace hitherto.

Due to the high speeds of rotation, the turbines are particularly effected by any small unbalance which may be present, and also it is desirable to make provision for absorption of vibration arising from self-excited "whirl" of the turbine rotor at certain speeds. However the space available for special bearing systems is limited because an essential requirement of such turbines is a relatively very small bulk, to enable the instrument to be used conveniently inside the mouth.

It is already known to have the rotor of such a turbine supported, in its bearings, on a film of air, and particularly on air derived from the same source as is used for driving the turbine itself. This air is fed under pressure not only to the blades of the turbine rotor but also through feed holes in outer bearing elements within which the rotor rotates with a very small clearance, the rotor being separated from the bearing element by a very thin film of air.

The main object of the present invention is to provide improvements in such air-bearing turbines, whereby provision is made for absorption of vibration arising from unbalance and whirl. Another object is to enable a plurality of independent bearings for a single rotor to be automatically self-aligning.

According to the present invention, a high speed turbine, of the kind including air bearings, comprises a support structure, a tool-receiving rotor having axially-spaced journal surfaces, and axially spaced bearing elements disposed about and co-acting with respective journal surfaces of the rotor, the bearing elements being mounted in the support structure by a resiliently compressible medium selected to provide damping of self-excited whirl of the rotor-tool assembly and absorption of out of balance forces of the rotor tool assembly.

Each bearing element may be independently mounted in the common support structure by the resiliently compressible medium, and such an arrangement permits each bearing element to move independently of the other, under all stages of running conditions. The resiliently compressible medium may encircle each bearing element and may also advantageously serve to form an air-tight seal between the bearing element and the support structure, e.g. to prevent axial flow of a compressed air stream fed to the bearing surfaces and thereby maintain the internal pressurising of each bearing, independently of any air supply to the turbine blades of the rotor.

Each such bearing element may be mounted in the common support structure by two, or more than two, axially-spaced resiliently compressible mounting means encircling the bearing element and forming an air-tight seal between the bearing element and the support, thereby to define with the support structure and the respective journal surface of the rotor an, or a number of, axially-sealed annular external airflow channels for receiving a flow of compressed air for the bearing surfaces, each bearing element including one or more air feed passages forming a communication between said channel and the internal bearing surface of the bearing element.

Such resiliently compressible mounting means encircling the bearing element may be disposed in respective annular recesses in the external surface of the bearing element, thereby serving to locate the mounting means against axial movement with respect to the bearing element, and ensuring that only a narrow radial gap need be provided between the bearing element and the support structure.

A convenient arrangement comprises two encircling peripheral grooves in the external surface of the bearing element, with an encircling resilient member in each groove, the grooves being advantageously placed near each end of the bearing element.

Each bearing element may comprise one or a plurality of annular internal channels, the or each such channel communicating with the internal bearing surface of the element through a plurality of circumferentially-spaced air feed openings.

For convenience of construction, each bearing element is advantageously made with an outer sleeve and an inner sleeve which are made as separate parts and subsequently assembled together, the inner and outer sleeves being so shaped and dimensioned at their respective outer and inner surfaces that when assembled they serve to define between them the plurality of internal annular channels referred to above.

For end-wise locating of the rotor in the supporting structure it is convenient to use a further air-bearing system between, for example, radial faces of the rotor and of the respective bearing elements.

For this purpose the or each bearing element may have openings in an end face for supply of the air from its air feed passage or passages to an air-bearing gap defined between that end face and a radial face of the rotor.

An alternative method of feeding compressed air to the bearing clearance between the radial faces of the rotor and the respective bearing elements utilises the air exhausting from the annular air bearing clearances. In this arrangement the radial faces are completely plain with no pockets or feed passages. Axial forces are withstood by an air film formed between the radial faces by air exhausting from the annular bearing clearances and flowing radially outwards between the radial faces. An advantage of this arrangement is that the quantity of compressed air consumed by the air bearings is considerably reduced, thereby ensuring that a large proportion of the air supplied to the handpiece is usefully expanded in the turbine. Another advantage of this arrangement is that the manufacture of the bearing elements is simplified by the elimination of the air passages and annular grooves in the radial faces of the bearing elements.

The resiliently compressible mounting means may conveniently be O-rings, particularly O-rings having a flattened internal annular face, e.g. a cylindrical inside face. In practice use has been made of certain proprietory rubber O-rings having a Shore Hardness factor of about 45°, which are particularly suitable for mounting such bearing elements and damping self-excited whirl instability. Harder rubber up to about 60° Shore would be suitable but would not give quite so satisfactory a result. Softer rubber, down to about 35° Shore would be suitable and would improve the absorptive effect, but introduces practical difficulties of production and obtaining of precise shapes and dimensions. Any resiliently compressible medium which does not have a tendency to harden under the effects of vibration may be used, and especially natural, butyl and synthetic rubbers.

It is to be appreciated that if the resiliently compressible absorptive mounting means were to be used solely as a packing or sealing device, the compressed air used for driving the turbine and for supplying the air-bearings would tend to compress the absorptive material and thereby cause the latter to assume an undesired degree of rigidity, with the result that the bearing elements would tend to become no longer suitably resiliently mounted for damping self-excited whirl forces. Accordingly, the resiliently compressible absorptive mounting material, in the form of O-rings or otherwise, is preferably arranged to be subjected solely to the pressure exerted directly on it by the compressed air and to the radially-acting unbalance forces exerted by the bearing elements themselves. To achieve this, the bearing elements are preferably supported against axial movement with respect to the support structure, e.g. mutually outwardly in a centre-fed turbine, by retaining means which are independent of the mounting means, e.g. end walls and plates or the like of a common housing within which the rotor can rotate.

It can be shown by calculation that, on a shaft of dimensions suitable for dental work, the tolerable out-of-balance at which the shaft will run successfully can be related to the following figures: the residual static out-of-balance must be less than approximately $6 \times 10^{-4}$ gram-centimetres, and the residual dynamic out-of-balance at one end of the shaft must be less than approximately $2 \times 10^{-4}$ gram-centimetres. However, by the use of suitable resilient mounting means, and in particular by the use of rubber of the Shore Hardness referred to, it is possible to absorb rather higher amounts of residual static and dynamic unbalance than those mentioned above.

In a preferred embodiment, the rotor has a set of turbine blades disposed between its two axially-spaced journal surfaces, the common support structure for the bearing elements including a housing which defines with, and about, the bladed portion of the rotor a driving air chamber which is eccentric with respect to the rotor, said housing including an air inlet port (or ports) which open into a radially-narrower part of said driving air chamber, and an exhaust port (or ports) which opens into a radially wider part of said driving air chamber.

In order that the nature of the invention may be readily ascertained, an embodiment of dental air-bearing turbine constructed in accordance therewith is hereinafter particularly described by way of example, with reference to the figures of the accompanying drawings, wherein.

Figure 1:
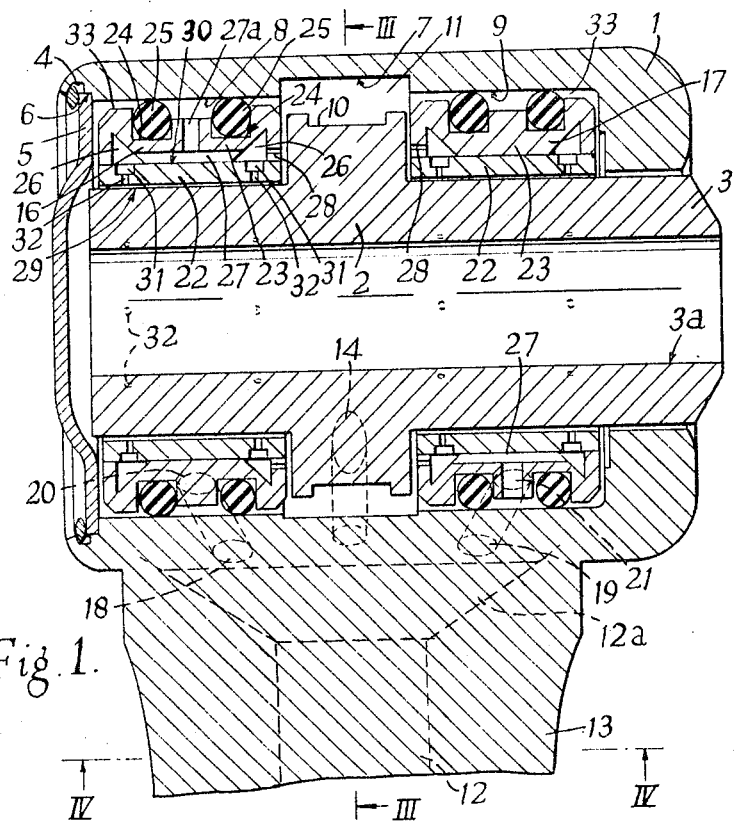
FIG. 1 is an axial section through a dental turbine.
Figure 2:
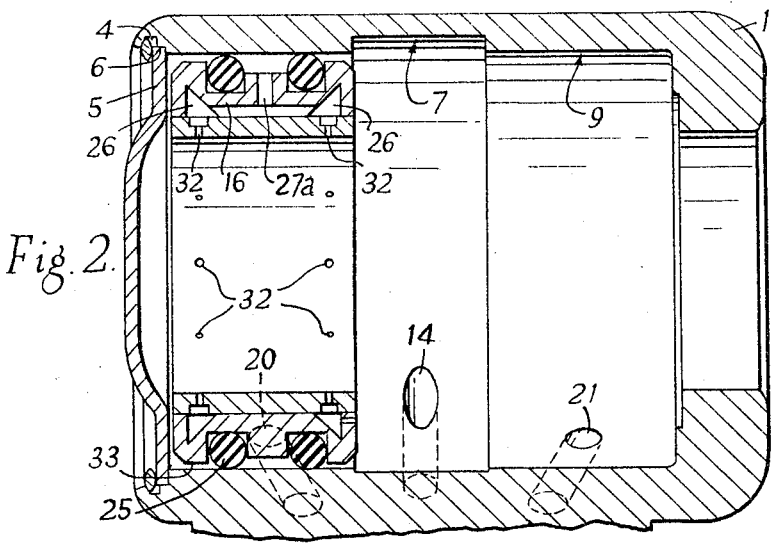
FIG. 2 is a similar view, with a rotor and one bearing removed.
Figure 3:
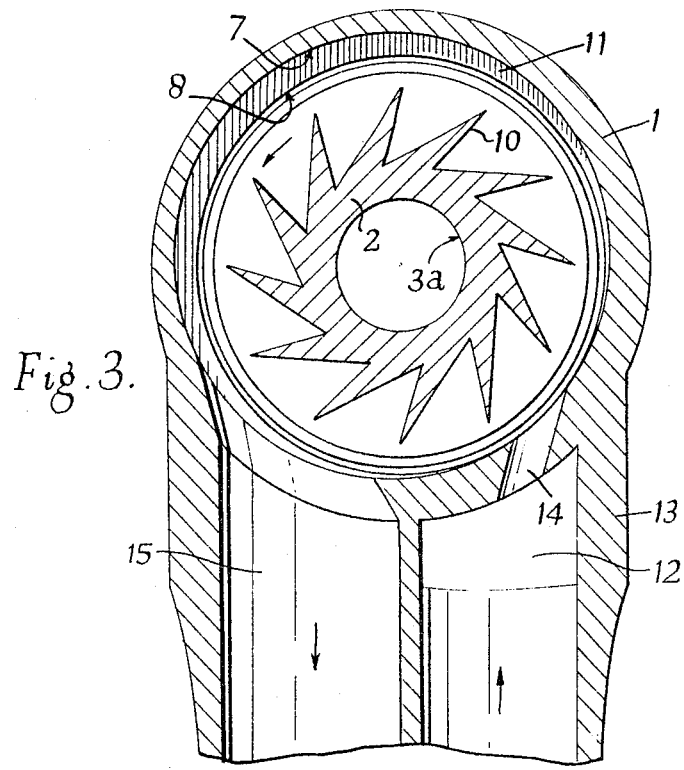
FIG. 3 is a diametral section taken on the line III—III.
Figure 4:
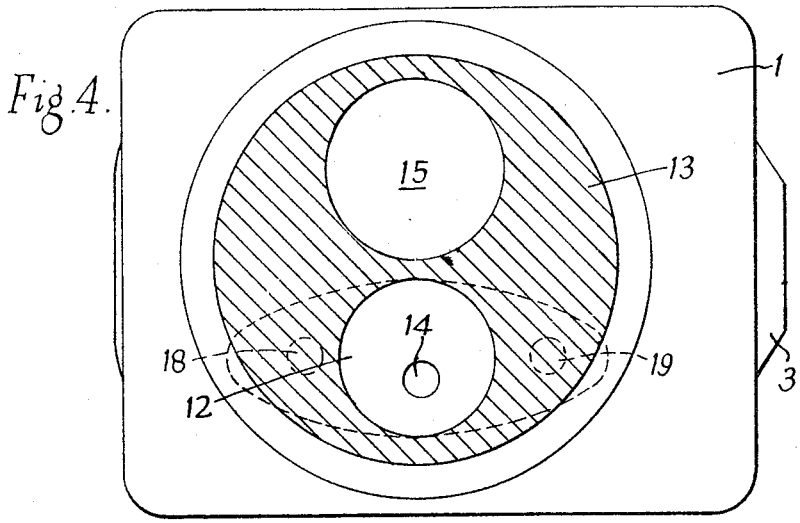
FIG. 4 is a section taken on the line IV—IV of FIG. 1, through a stem for the turbine.

The turbine comprises a hollow housing 1 which is open at both ends. One end of the housing is centrally apertured co-axially with a rotor 2, to permit one end 3 of the rotor to protrude with clearance and form a shank into the bore 3a of which there can be inserted the shaft of the usual dental burr (not shown). The other end of the housing is fully open, to a diameter larger than the greatest diameter of the rotor 2 to permit insertion of the rotor and its bearings from that end. Adjacent the latter open end there is an internal circumferential under-cut or recess 4 to receive the rim of a disc-shaped end plate 5 for the housing, and a retaining device such as a circular spring clip 6.

The housing is provided approximately centrally with an internal cylindrical surface 7 of somewhat greater diameter than the adjacent surfaces 8 and 9, said surface 7 corresponding to an approximately-central portion of the rotor on which turbine blades 10 are provided, so forming an air flow channel 11 of eccentric pattern.

An inlet passage 12 for compressed air passes up a stem 13 of the turbine casing and opens at an inlet port 14 at the narrowest part of the channel 11. The inlet port 14 for the rotor opens into the housing 1 on the side having the minimum gap due to eccentricity of the channel 11, the air subsequently discharging in the region of maximum eccentricity through an exhaust port 15. The two approximately equal cylindrical surfaces 8 and 9, at each side of the central surface 7, are coaxial and of equal diameter and serve to receive two similar bearing elements 16 and 17.

The inlet passage 12 for compressed air widens at its top to form a chamber 12a from which two passages 18 and 19 open respectively into the interior of the housing at ports 20 and 21 respectively positioned one along each of the coaxial surfaces 8 and 9 of the housing.

Each bearing element 16, 17 is made up of an inner sleeve 22 and an outer sleeve 23. The outer sleeve 23 has in its external cylindrical surface two similar circumferential grooves 24 each receiving an O-ring 25. The internal surface of each outer sleeve is also provided with two similar annular channels 26 disposed near to the end faces of the sleeve, these channels 26 being in communication through respective axially-running passages 27 with a radial hole 27a opening into each axially running passage 27. At the end facing the rotor, the end wall of the outer sleeve 23 is drilled symmetrically with a number of holes 28, these being drilled normal to the end face of the outer sleeve 23, so forming a communication between one of the internal channels 26 and the adjacent end face of the sleeve 23. Within the outer sleeve is fitted the inner sleeve 22 which has a cylindrical inner bearing surface 29, and an outer cylindrical surface 30 with two grooves 31 to correspond to the channels 26 of the outer sleeve 23. At each groove 31 of the inner sleeve 22, the latter is radially bored symmetrically at intervals around the circumference to provide air-feed openings 32 leading from the grooves 31 to the bearing surface 29. Air is fed to each bearing element through the respective port 20 or 21.

Each composite bearing element 16, 17 is disposed within one of the cylindrical surfaces 8 or 9 of the housing 1 and is supported therein by a pair of axially-spaced rubber O-rings 25 disposed one in each external groove 24. These O-rings 25 serve not only to mount the bearing elements 16 in the housing 1, but also to seal off the air stream fed in centrally for the turbine blades from escaping outwardly past the exterior of the bearing elements 16, 17 to the ends of the housing 1.

By keeping the external clearance between each bearing element 16, 17 and its associated bore to a minimum, say .002–3 inches, the rubber does not tend to get trapped into the sealing area, thereby retaining its inherent resilient resilience and not becoming stiffer, as would occur if it became wedged between the bearing element and housing. The interference fit of the rubber to the housing is preferably of the order of .002–.003 inch.

The inner sleeve 22 is formed as a thin-wall tube for convenience of forming the air feed openings 32.

The rubber used for the O-rings in one practical embodiment has a Shore Hardness factor of 45°. The clearance between the turbine journal surfaces and the bearing surfaces 29 is extremely important and in the construction described would preferably be of the order of .00025 to .00030 inch of radial clearance. Under these conditions, and incorporating the rubber O-rings 25 mentioned above, it is possible to run the rotor 2 in the bearing elements 16, 17 at speeds of up to 750,000 r.p.m. There is no vibration arising from "run-out" (lack of exactly concentric mounting of the tool in the rotor). In the case of hand tools with interchangeable cutters the major unbalance load is due to such "run-out" of the cutters, and the use of a resiliently compressible mounting medium in accordance with the invention enables a wide range of cutters to be used successful. There is very little friction inside the bearing, enabling the shaft to run with a very small driving force. It has been found that when the air pressure is applied to each bearing element 16, 17, the O-rings 25 ride up and seal the gaps 33 between the bearings and housing, and the stiffness produced within the bearing between the journals and the housing 1 is such as to force the bearing elements 16, 17 into alignment on their resilient rubber mountings. Under these conditions the rotor 2 then spontaneously starts to rotate, at the same time being completely flexibly mounted and ready to absorb all the vibrations produced by residual out-of-balance and self-excited whirl which cannot at present be entirely eliminated in practice.

We claim:
1. A high speed air turbine and bearings therefor comprising: a housing having an annular air driving chamber therein and a peripherally bladed rotor mounted eccentrically in said chamber; means in said housing to supply compressed air to said turbine and bearings; said bladed rotor having opposed end walls substantially normal to the axis of said rotor; a cylindrical journal extending from each end wall; a support structure for each of said journals, each support structure comprising a bearing having an axially extending annular support surface opposite to one of said cylindrical journals and a radial support surface opposite one of said end walls of said rotor; a plurality of apertures in said annular support surfaces and said radial support surfaces whereby compressed air is supplied thereto to support said rotor against both radial and axial movement; and an annular ring of rubber-like material about each support structure, having a Shore hardness of about 45°, separating the support structures completely from said housing for damping unbalanced forces arising from the whirl of the rotor.

2. A high speed air bearing turbine, as claimed in claim 1, wherein each bearing is mounted in the support structure by at least two axially-spaced resiliently compressible annular members encircling the support structure and forming an air-tight seal between the bearing elements and the support structure, thereby to define with the support structure and the respective journal surface of the rotor at least one axially-sealed annular external air-flow channel for receiving a flow of compressed air fed to the bearing surfaces, each bearing including a number of air feed passages forming a communication between said channel and its internal bearing surface.

3. A high speed air bearing turbine, as claimed in claim 2, wherein each bearing has an internal bearing surface and comprises a plurality of annular internal channels communicating with said internal bearing surface through a plurality of circumferentially-spaced air feed openings.

4. A high speed air bearing turbine, as claimed in claim 2, wherein the rotor has a set of turbine blades disposed between its axially-spaced journal surfaces, the support structure including a housing which defines with the bladed portion of the rotor a chamber for driving air which is eccentric with respect to the axis of the rotor, said housing including air inlet porting which opens into a radially narrower part of said driving air chamber, and air exhaust porting which opens into a radially wider part of said driving air chamber.

References Cited by the Examiner
UNITED STATES PATENTS

| | | | |
|---|---|---|---|
| 2,471,812 | 5/1949 | Christiano | 230—232 |
| 2,671,700 | 3/1954 | Seyffert. | |
| 2,799,934 | 7/1957 | Kern. | |
| 2,895,738 | 7/1959 | Baker | 252—2 |
| 3,088,707 | 5/1963 | Williams et al. | 253—2 |
| 3,123,338 | 3/1964 | Borden | 253—2 |
| 3,134,172 | 5/1964 | Sato. | |
| 3,147,551 | 9/1964 | Seegers | 253—2 |

MARK NEWMAN, *Primary Examiner.*
HENRY F. RADUAZO, *Examiner.*
SAMUEL LEVINE, *Assistant Examiner.*